United States Patent
Rabii et al.

(10) Patent No.: US 10,172,055 B2
(45) Date of Patent: Jan. 1, 2019

(54) CONTROLLING WIRELESS ACCESS POINT HANDOVER AND/OR TRANSMISSIONS MODE BASED ON PERSON PROXIMITY

(71) Applicant: Thales Avionics, Inc., Irvine, CA (US)

(72) Inventors: Khosro Rabii, San Diego, CA (US); Jean-Yves Couleaud, Mission Viejo, CA (US); Pierre Schuberth, Corona del Mar, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 15/446,115

(22) Filed: Mar. 1, 2017

(65) Prior Publication Data

US 2018/0255491 A1  Sep. 6, 2018

(51) Int. Cl.
| | |
|---|---|
| *H04W 36/00* | (2009.01) |
| *H04W 36/08* | (2009.01) |
| *H04W 4/02* | (2018.01) |
| *H04W 4/04* | (2009.01) |
| *H04W 84/12* | (2009.01) |

(52) U.S. Cl.
CPC ........... *H04W 36/08* (2013.01); *H04W 4/023* (2013.01); *H04W 4/046* (2013.01); *H04W 84/12* (2013.01)

(58) Field of Classification Search
CPC ..... H04W 8/183; H04W 48/18; H04W 36/30; H04W 36/18; H04W 36/12; H04W 36/04; H04W 16/32; H04W 24/00; H04W 28/04; H04W 72/082; H04W 4/02; H04W 64/00; H04L 29/08657

USPC .............. 455/432.1–453, 456.1–456.3, 457; 370/329–334

See application file for complete search history.

(56) References Cited

U.S. PATENT DOCUMENTS

| | | | |
|---|---|---|---|
| 8,134,969 B2 * | 3/2012 | Korus | H04L 29/12811 370/331 |
| 9,554,320 B2 * | 1/2017 | Yamamoto | B61L 27/0005 |
| 9,813,969 B2 * | 11/2017 | Axmon | H04B 7/18506 |
| 9,883,437 B2 * | 1/2018 | Abraham | H04W 36/0061 |
| 9,992,817 B2 * | 6/2018 | Yuan | H04B 1/3822 |
| 2005/0197748 A1 * | 9/2005 | Holst | G06F 8/61 701/3 |
| 2011/0219407 A1 * | 9/2011 | Margis | H04N 7/163 725/75 |
| 2012/0214412 A1 | 8/2012 | Schlub et al. | |

(Continued)

*Primary Examiner* — Dai A Phuong
(74) *Attorney, Agent, or Firm* — Sage Patent Group (57) ABSTRACT

An in-flight entertainment system including wireless access points (WAPs) spaced apart within an aircraft and connected to antennas, proximity sensors adjacent to the antennas, and a controller. The controller controls transmissions from WAPs of traffic in communication sessions. The controller performs operations that include receiving a proximity alert signal from a first proximity sensor indicating that a passenger is proximately located to a first antenna used by a first WAP for transmission of a communication session, and identifying a remedial action responsive to evaluating a rule based on the proximity alert signal and characteristics of the communication session. The operations include performing the remedial action as one of: 1) initiating handover of the communication session from the first WAP to a second WAP; and 2) initiating a change in transmission mode that will be used by the first WAP for continued transmission of the communication session.

18 Claims, 7 Drawing Sheets

(56) References Cited

U.S. PATENT DOCUMENTS

| | | | |
|---|---|---|---|
| 2012/0222058 A1* | 8/2012 | el Kaliouby | H04N 21/251 |
| | | | 725/10 |
| 2014/0071008 A1 | 3/2014 | Desclos et al. | |
| 2014/0128032 A1 | 5/2014 | Muthukumar | |
| 2014/0333494 A1 | 11/2014 | Huang | |
| 2016/0020838 A1* | 1/2016 | Desclos | H04B 7/0689 |
| | | | 455/500 |
| 2016/0127523 A1* | 5/2016 | Rouaissia | H04M 1/0266 |
| | | | 455/566 |
| 2016/0249156 A9* | 8/2016 | Varoglu | H04W 12/06 |
| 2016/0309373 A1* | 10/2016 | Khawer | H04W 4/26 |

* cited by examiner

CONTROLLING WIRELESS ACCESS POINT HANDOVER AND/OR TRANSMISSIONS MODE BASED ON PERSON PROXIMITY

FIELD OF THE INVENTION

The present disclosure relates to communication systems and, more particularly, to aircraft-based in-flight entertainment systems having wireless access points for communication with passenger terminals, seat video display units, and other communication terminals.

BACKGROUND

In-flight entertainment (IFE) systems have been deployed onboard aircraft to provide entertainment for passengers. The in-flight entertainment systems typically provide passengers with electronic content, such as movies, television, and audio entertainment programming IFE systems are increasingly using wireless access points to stream electronic content from a content server to passenger terminals, seatback video display units, and other communication terminals within the aircraft. In view of the large number of simultaneous high-bandwidth communication sessions that can be required to support video streaming within an aircraft fuselage, the wireless access points can have high-power transceivers connected to directional beamforming multiple-input multiple-output (MIMO) antennas.

Mounting MIMO antennas within an aircraft fuselage is complicated by requirements for maximizing space available for passengers and balancing the need for reserving space for flight critical systems, crew systems, passenger facilities, etc. Moreover, identifying locations for MIMO antenna mounting is further complicated by the need to balance antenna coverage with reducing interference to other MIMO antennas and flight critical systems. Consequently, MIMO antennas are increasingly being integrated into passenger seating areas, fuselage interior sidewalls, bulkheads, overhead storage panels, and other locations where passengers can be located.

It is therefore becoming increasingly likely that passengers can fall asleep against, lean against, stand next to, or otherwise be very close to these antennas. The presence of a passenger's head, hand, or other body part against one of the MIMO antennas can cause radiation pattern distortion or detuning of the antenna and absorption of the radiation, thus affecting the efficiency and correlation performance of the antenna. Moreover, the antennas can have deleterious effects on passengers' health. The World Health Organization (WHO) has classified the radiation generated by radio frequency (RF) transmitters as possibly carcinogenic. Other health concerns from such radiation can include triggering a passenger's electromagnetic hypersensitivity, cause thermal or heating effects to a passenger, cause loss of memory or other deleterious cognitive effects, and interfere with operation of a passenger's electro-medical device such as a pacemaker or hearing aid.

SUMMARY

Some embodiments of the present disclosure are directed to an in-flight entertainment system that includes wireless access points (WAPs) spaced apart within an aircraft and mounted to structures of the aircraft, a plurality of proximity sensors, and a WAP controller. Each of the WAPs are connected to an antenna used by the WAP for transmission of communication sessions to communication terminals. Each of the proximity sensors is mounted adjacent to a different one of the antennas and configured to generate a proximity alert signal indicating that a passenger is proximately located to the antenna. The WAP controller is configured to control radio transmission from WAPs of traffic in communication sessions to communication terminals. The WAP controller includes a network interface, a processor coupled to the network interface, and a memory coupled to the processor and storing program code that when executed by the processor causes the processor to perform operations. The operations include receiving a proximity alert signal from one of the proximity sensors indicating that a passenger is proximately located to a first one of the antennas used by a first one of the WAPs for transmission of a communication session, and identifying a remedial action responsive to evaluating a WAP handover/mode-change rule based on the proximity alert signal and characteristics of the communication session. The operations further include performing the remedial action as one of: 1) initiating handover of the communication session from the first one of the WAPs to a second one of the WAPs to satisfy the WAP handover/mode-change rule; and 2) initiating a change in transmission mode that will be used by the first one of the WAPs for continued transmission of the communication session to satisfy the WAP handover/mode-change rule.

Some other embodiments of the present disclosure are directed to a method performed by a processor of a wireless access point (WAP) controller to control radio transmission of traffic in communication sessions from WAPs to communication terminals. The method includes receiving a proximity alert signal from a proximity sensor indicating that a person is proximately located to an antenna used by a first WAP for transmission of a communication session to a communication terminal. A remedial action is identified responsive to evaluating a WAP handover/mode-change rule based on the proximity alert signal and characteristics of the communication session. The remedial action is performed as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule.

Some other embodiments of the present disclosure are directed to a WAP controller to control radio transmission from WAPs of traffic in communication sessions to communication terminals. The WAP controller includes a network interface, a processor coupled to the network interface, and a memory coupled to the processor and storing program code that when executed by the processor causes the processor to perform operations. The operations include receiving a proximity alert signal from a proximity sensor indicating that a person is proximately located to an antenna used by a first WAP for transmission of a communication session to a communication terminal, and identifying a remedial action responsive to evaluating a WAP handover/mode-change rule based on the proximity alert signal and characteristics of the communication session. The operations further include performing the remedial action as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule.

Other systems, methods, and/or WAP controllers according to embodiments of the inventive subject matter will be or become apparent to one with skill in the art upon review of the following drawings and detailed description. It is intended that all such additional systems, methods, and/or WAP controllers be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to innovative operations and methods for controlling operations of wireless access points (WAPs) based on detecting that a person has become proximately located to one or more antennas used by the WAPs for communication. These operations can be particularly beneficial for use in aircraft and other enclosed vehicles where antennas can be mounted in locations that passengers can touch for a prohibitively long time that raises health concerns and/or antenna performance degradation issues. Although various embodiments herein are primarily described in the context of an In-flight entertainment (IFE) system deployed onboard an aircraft, the invention is not limited thereto. Instead, these and other related embodiments may be used to control WAPs located in other types of vehicles, including without limitation, trains, automobiles, cruise ships, and buses, and in other non-vehicle installations, including without limitation, meeting rooms, sports stadiums, etc.

Figure 1:
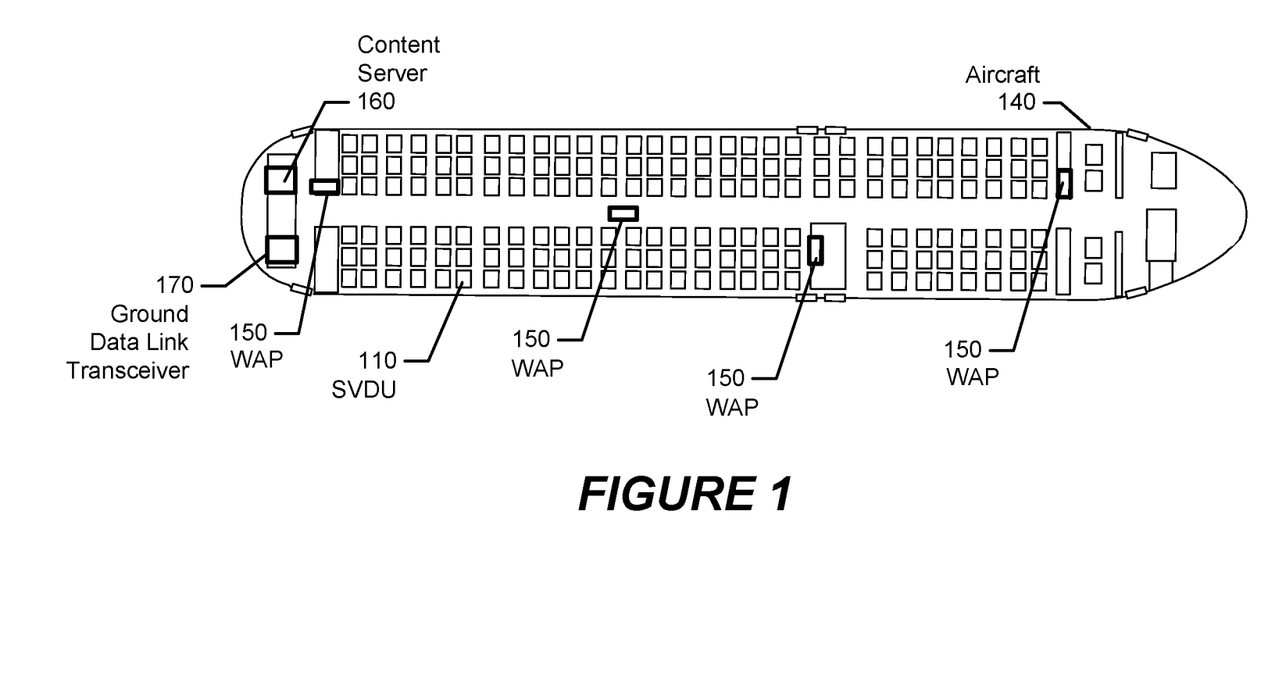
FIG. 1 illustrates an aircraft fuselage containing an entertainment system having a content server that streams electronic content through wireless access points (WAPs) and communicates through a ground data link transceiver, in accordance with some embodiments of the present disclosure.

FIG. 1 illustrates an aircraft fuselage 140 containing an IFE system that provides entertainment services to passengers. The IFE system can include a content server 160 that streams and/or downloads electronic content through WAPs 150 to seat video display units (SVDUs) 110 that may be mounted within seatbacks, seat armrests/frames, bulkheads, overhead structures, etc., and to passenger terminals, such as mobile phones, tablet computers, laptop computers, etc. The SVDUs 110 may each contain a WAP that wirelessly communicates through RF signaling with passenger data units (PDUs) that may be releasable docked to an armrest receptacle and/or a receptacle of the SVDUs 110. When a WAP is within a SVDU, the WAP is understood to be the communication circuitry (i.e., transceiver, signal processor, etc.) which can be incorporated within the same housing that at least partially encloses a display device, video display circuitry, network interface, and other circuitry providing functionality for the SVDU.

The WAPs 150 transmit and receive through RF signaling via respective antennas that are mounted within the interior space of the aircraft fuselage 140. The WAPs 152 communicate through a RF wireless air interface that can be based on one or more RF communication protocols including, without limitation, any one or more of IEEE 802.11, WIMAX, 3GPP Long Term Evolution (LTE), etc. The antennas may, for example, be integrated into passenger seating areas, fuselage interior sidewalls, near windows, bulkheads, overhead storage panels, and other locations that passengers can touch.

The system may also include a ground data link interface 170 that is configured to provide RF wireless data communications through a satellite communication system and/or through direct aircraft-to-ground communication links. In one embodiment, the ground data link interface 170 provides data communications capabilities for aircraft within range of ground based communications network equipment located at airports, using radio transceiver circuits located onboard the aircraft and at airports (e.g., at gate locations). The ground data link interface 170 may use, without limitation, IEEE 802.11, WIMAX, 3GPP LTE and/or other terrestrial communication technologies, and/or may use, without limitation, KU Band, KA Band, and/or other satellite communication technologies. The ground data link transceiver 170 may be used to provide Internet access to passengers, allow uploading and/or downloading electronic content between ground-based servers and the IFE system, etc. The ground data link transceiver 170 transmits and receives through a MIMO antenna that may be mounted to one of the windows in the aircraft fuselage 140 to reduce interference from the conductive aircraft body.

Figure 2:
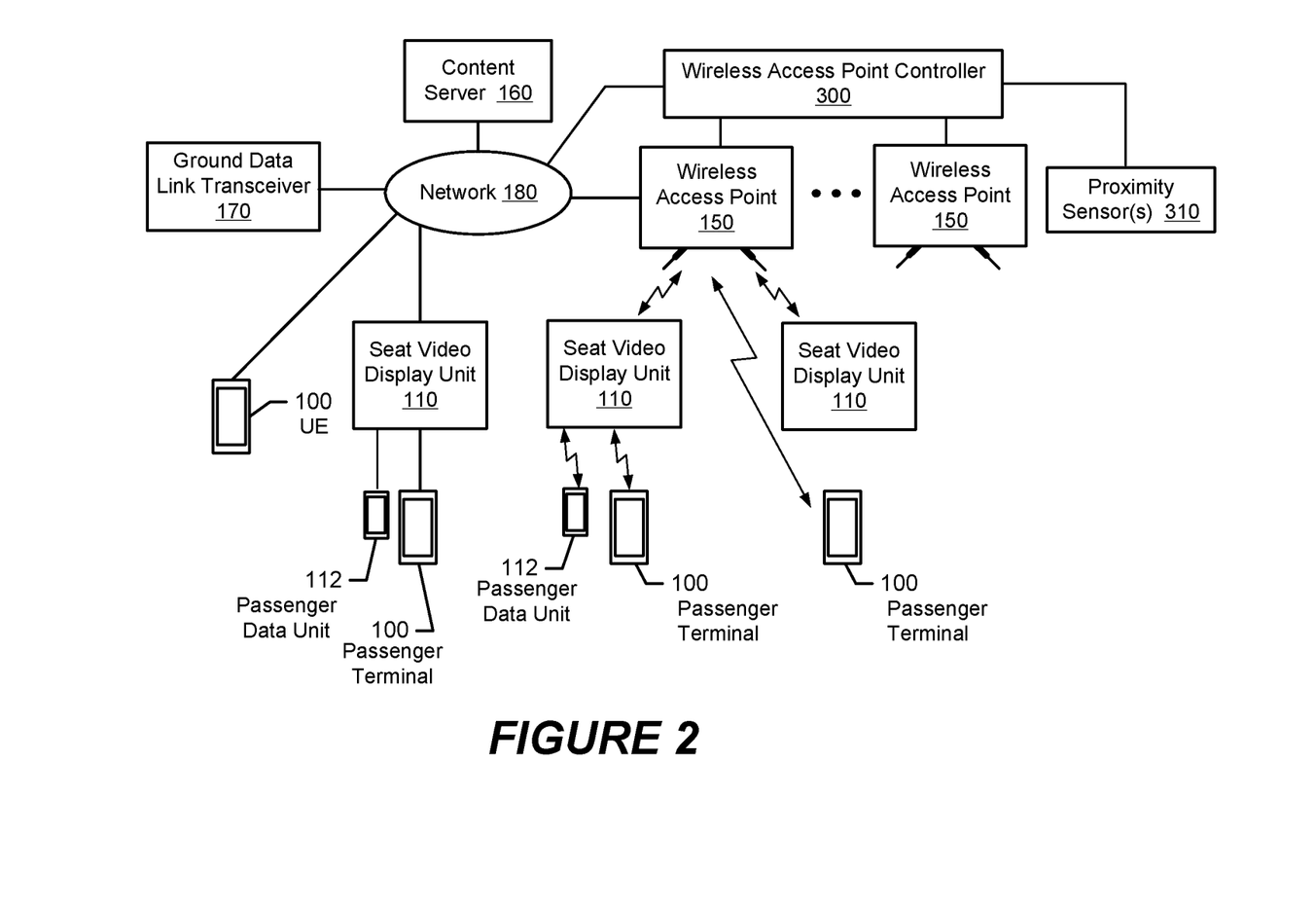
FIG. 2 is a block diagram illustrating an IFE system that includes a WAP controller that controls handover and/or transmission modes for the WAPs contained in the IFE system of FIG. 1 and which are configured to operate in accordance with some embodiments of the present disclosure.

FIG. 2 is a block diagram that illustrates the IFE system of FIG. 1 as including a WAP controller 300 that controls handover and/or transmission modes for the WAPs 150 in accordance with some embodiments of the present disclosure.

Referring to FIG. 2, the IFE system includes a content server 160 that stores content files which may include movies, television programming, games, applications, electronic books/magazines, route information, destination information, etc. Other types of content files that can be download/uploaded from/to the content server 160 can include IFE usage data, passenger on-board purchase transactions data, airline operations data, flight related data including a passenger manifest, etc. Passengers may also be provided in-flight shopping services through the SVDUs 110 and/or passenger terminals 100 based on product catalogs that are downloaded from the content server 160.

The system also includes WAPs 150 spaced apart within the aircraft and mounted to structures therein. Each of the WAPs 150 are connected to an antenna used for RF transmission of traffic in communication sessions to the passenger terminals 100 and/or the SVDUs 110, and similar receipt of traffic therefrom. As shown in FIG. 2, the WAPs 150 may communication through direct links with the passenger terminals 100 and/or indirectly through the SVDUs 110. Some WAPs 150 may be connected through wired links (e.g., Ethernet) with the SVDUs 110. The PDUs 112 may communicate with the SVDUs 110 through wireless links (e.g., WAPs incorporated into the SVDUs 110) and/or through wired links. The WAPs 150 are connected to the content server 160 and the ground data link transceiver 170 through one or more networks 180.

In accordance with embodiments of this disclosure, the system further includes proximity sensors 310, which are each mounted adjacent to a different one of the WAP antennas and configured to generate a proximity alert signal indicating that a passenger is proximately located to the antenna. A WAP controller 300 is configured to control radio transmission from the WAPs 150 of traffic in communication sessions between the content server 160, the ground data link transceiver 170, etc., and the passenger terminals 100, the SVDUs 110, and/or other terminals being served by the WAPs 150.

Figure 3:
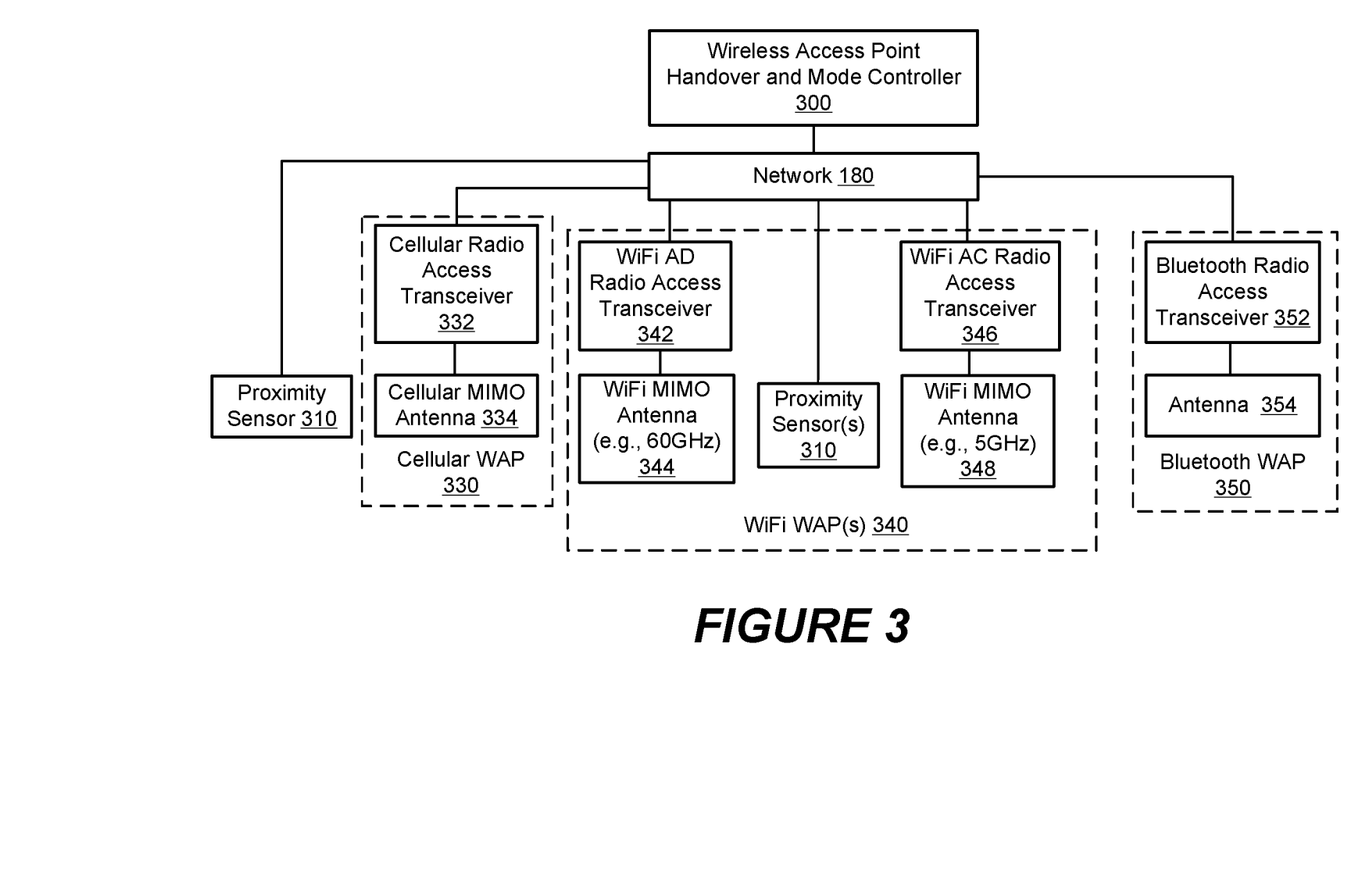
FIG. 3 is a block diagram illustrating further details of the WAP controller, proximity sensors, and the WAPs contained in the IFE system of FIG. 1 and which are configured to operate in accordance with some embodiments of the present disclosure.
Figure 7:
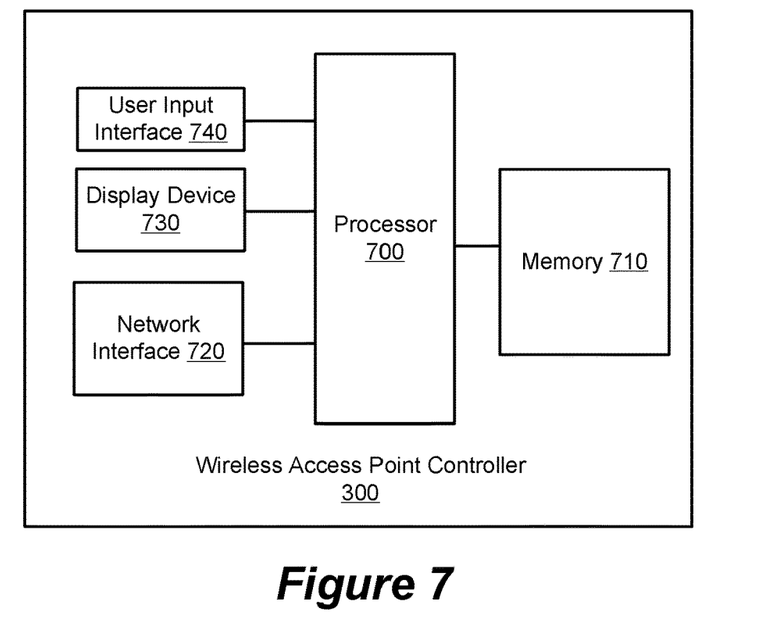
FIG. 7 is a block diagram of a WAP controller configured to operate in accordance with some embodiments of the present disclosure.

Various operations that can be performed by the WAP controller 300 are explained in the context of FIGS. 3-7. FIG. 3 is a block diagram illustrating further details of the WAP controller 300, the proximity sensors 310, and the WAPs 150 contained in the IFE system of FIG. 1 and which are configured to operate in accordance with some embodiments of the present disclosure. FIG. 7 is a block diagram of a WAP controller 300 configured to operate in accordance with some embodiments of the present disclosure.

Referring to FIGS. 3 and 7, the WAP controller 300 includes a network interface 720, a processor 700 and a memory 710. The network interface 720 communicates with the WAPs 150 through, e.g., the network 180. The processor 700 is coupled to the network interface 720 and the memory 710. The memory stores program code that when executed by the processor causes the processor to perform operations.

In accordance with various embodiments herein, the operations include receiving a proximity alert signal from one of the proximity sensors 310 indicating that a passenger is proximately located to a first one of the antennas used by a first one of the WAPs 150 for transmission of a communication session. The WAP controller 300 identifies a remedial action responsive to evaluating a WAP handover/mode-change rule based on the proximity alert signal and characteristics of the communication session, and performs the remedial action as one of: 1) initiating handover of the communication session from the first one of the WAPs 150 to a second one of the WAPs 150 to satisfy the WAP handover/mode-change rule; and 2) initiating a change in transmission mode that will be used by the first one of the WAPs 150 for continued transmission of the communication session to satisfy the WAP handover/mode-change rule.

In the example embodiment of FIG. 3, the system has different types of WAPs 150, including a cellular WAP 330, one or more WiFi WAPs 340, and a Bluetooth WAP 350. Although only three different types of WAPs have been illustrated for simplicity, is to be understood that any number of WAPs may be within an aircraft and include any type of RF communication technology. For example, each seat based SVDU may include a WAP, each associated PDU 112 may include a WAP, and other WAPs may be mounted in the aircraft.

The cellular WAP 330 includes a cellular radio access transceiver 332 that transmits and receives through a cellular MIMO antenna 344. The one or more WiFi WAPs 340 can include a WiFi AD radio access transceiver 342 that communicates through a MIMO antenna 344 that can be configured to operate in a frequency band including 60 GHz. The same or another WiFi WAP 340 can include a WiFi AC radio access transceiver 346 that communicates through a MIMO antenna 344 that can be configured to operate in a lower frequency band such as 5 GHz and/or 2 GHz. The radio access transceivers 342 and 346 and corresponding antennas 344 and 348 may be within the same physical WiFi WAP device or may be within separate WiFi WAP devices mounted at spaced apart locations within the aircraft. The Bluetooth WAP 350 includes a Bluetooth radio access transceiver 352 that transmits and receives through an antenna 354.

As explained above, the antennas would likely be mounted in locations that passengers can touch for a prohibitively long time, such as in a sidewall of the aircraft that a passenger's head may rest against while sleeping, which raises health concerns and/or antenna performance degradation concerns. For example, when a WiFi MIMO antenna 344 is used with the ground data link transceiver 170, it has been suggested that the antenna 344 could be mounted to window portal and in which case a passenger seat may be sufficiently close that to create a risk that a passenger's head would rest against the antenna 344. The associated concerns are greatly increased for higher frequency and/or higher power RF transmissions, such as the 60 GHz transmission generated by the WiFi AD radio access transceiver 342 through the MIMO antenna 344, and/or the cellular radio band(s) transmissions generated by the cellular radio access transceiver 332 through the cellular MIMO antenna 334.

In accordance with various embodiments herein, the proximity sensor 310 is mounted within a same housing as one of the antennas or mounted adjacent to one of the antennas and configured to sense when a passenger has become proximately located to the antenna, such as when a passenger is resting a head, head or other body part against the antenna. The proximity sensor 310 responsively generates a proximity alert signal indicating the passenger's proximity. The WAP controller 300 receives the proximity alert signal and responsively identifies and performs a remedial action.

As will be explained in further detail below with regard to FIGS. 4 through 6, the remedial action can include initiating handover of a communication session from the affected WAP to another WAP that is spaced apart from the affected WAP, or can include initiating a change in transmission mode that will be used by the affected WAP for continued transmission of the communication session. The transmission mode may, for example, be switched from a higher-power higher-frequency transmission mode to a lower-power lower-frequency to transmission mode, such as from WiFi AD mode to WiFi AC mode, and maintained in the WiFi AC mode for the duration that the associated proximity sensor detects continued passenger proximity.

In one embodiment, the proximity sensor 310 includes an electrical capacitance sensor that senses capacitive coupling to a person's body that has become within closely spaced to the sensor 310. The sensor 310 may therefore include a plate or other surface that is charged to generate an electric field, and a voltage sensor that determines when and/or how much coupling occurs between the electric field and a proximately located object.

In another embodiment, the proximity sensor 310 includes a camera, such as a camera of the SVDU 110. A processor of the SVDU 110 can process a video signal from the camera to determine that the person's body is proximately located, such as when resting against a portion of the SVDU 110 having the antenna, and responsively output the proximity alert signal to the WAP controller 300.

The WAP controller 300 may respond to the proximity alert signal by initiating handover from the WiFi AD radio access transceiver 342 to a Bluetooth radio access transceiver 352 that is associated with the seat of the passenger proximately located to the antenna. For example, when a passenger's head is leaning forward and resting against an antenna in the forward seatback, such as within the SVDU 110 associated with the passenger's seat, the associated WiFi AD radio access transceiver 342 and/or the WiFi AC radio access transceiver 346 may be controlled by the WAP controller 300 to perform handover of a communication session to a Bluetooth radio access transceiver 352 that resides in a PDU 112 or a passenger terminal 100 that is communicatively connected to that SVDU 110. A communication session between the passenger's terminal 100 and the SVDU 110 that had been carried out through WiFi AD/AC communications may thereby be handed over to a Bluetooth link between Bluetooth radio access transceivers within the passenger terminal 100 and the SVDU 110.

Figure 4:
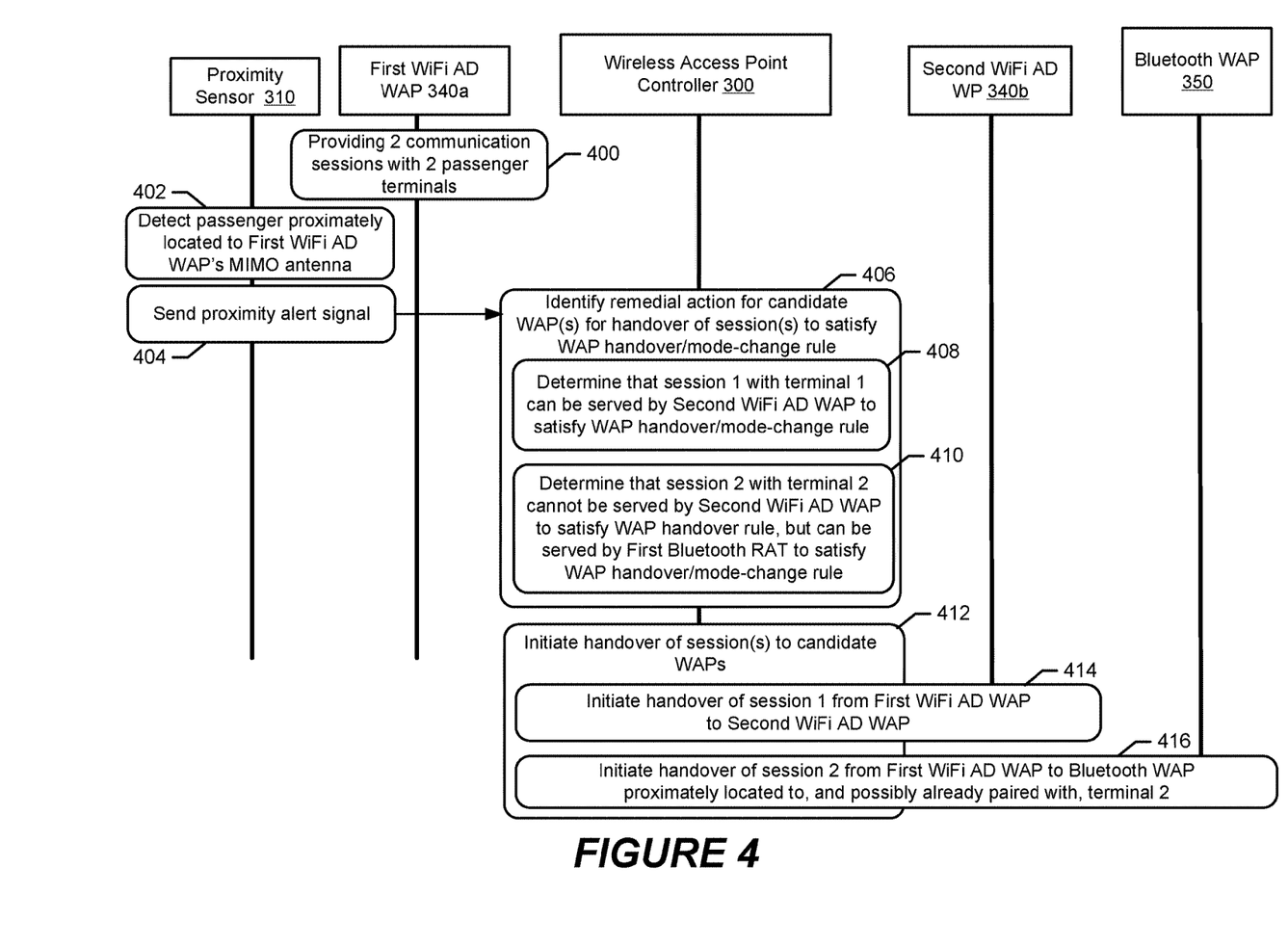
FIG. 4 is a combined flowchart and data flow diagram of operations and methods performed by the WAP controller, the WAPs, and the proximity sensors of FIG. 3 to perform handover between WAPs based on passenger proximity in accordance with some embodiments of the present disclosure.

FIG. 4 is a combined flowchart and data flow diagram of operations and methods performed by the WAP controller 300, the WAPs 340a,340b,350, and the proximity sensors 310 of FIG. 3 to perform handover from WAP 340a to WAPs 340b,350 based on passenger proximity to an antenna of WAP 340a, in accordance with some embodiments of the present disclosure. Referring to FIG. 4, a first WiFi WAP 340a operating in AD mode (WiFi AD WAP) is providing (block 400) two communication sessions (session 1 and session 2) to two different passenger terminals 100 (terminal 1 and terminal 2). The proximity sensor 310 detects (block 402) that the passenger has become proximately located to the MIMO antenna 344 used by the first WiFi AD WAP 340a, and responsively sends (block 404) a proximity alert signal to the WAP controller 300. The WAP controller 300 responds by identifying (block 406) a remedial action to be taken by one or more candidate WAPs of the system to satisfy a WAP handover/mode-change rule, which in the case of FIG. 4 involves initiating handover of the sessions from WAP 340a to WAPs 340b,350.

In the example of FIG. 4, the WAP controller 300 determines (block 408) that session 1 with terminal 1 can be served by the second WiFi AD WAP 340b, such as because a rule is satisfied by WAP 340b having sufficient available bandwidth to carry traffic of session 1 and having sufficient signal link quality to terminal 1. The WAP controller 300 also determines that session 2 with terminal 2 cannot be served by the second WiFi AD WAP 340b due to WAP 340b having insufficient available bandwidth to carry session 2 and/or having insufficient signal link quality to terminal 2. The WAP controller 300 then further determines that session 2 can be served by Bluetooth WAP 350 to satisfy the rule, because Bluetooth WAP 350 has sufficient available bandwidth to carry traffic of session 2 and one or more further rules being satisfied for: 1) terminal 2 being presently paired to Bluetooth WAP 350 having sufficient signal link quality; or 2) terminal 2 has been discovered by Bluetooth WAP 350 although no pairing has been established.

The WAP controller 300 initiates (block 412) handover of the sessions to the candidate WAPs. In the further example of FIG. 4, the WAP controller 300 initiates (block 414) handover of session 1 from the first WiFi AD WAP 340a to the second WiFi AD WAP 340b, such as by communicating a handover initiation message to the first and second WAPs 340a,340b and/or to the first WAP 340a and terminal 1. The WAP controller 300 also initiates (block 416) handover of session 2 from the first WiFi AD WAP 340a to the Bluetooth WAP 350, such as by communicating a handover initiation message to the first WAP 340a and the Bluetooth WAP 350 and/or to the first WAP 340a and terminal 2.

In this manner, the WAP controller 300 remedies the situation where the passenger's head is resting against the antenna 344 used by the first WiFi AD WAP 340a by initiating handover of one session to a separate and more distantly located other WiFi AD WAP 340b and initiating handover of another session to a separate and lower power Bluetooth WAP 350. The WAP controller 300 thereby reduces the amount of transmissions (i.e., lowers the average transmission power) or entirely stop transmissions from the first WiFi AD WAP 340a for the duration that the proximity sensor 310 continues to indicate that the passenger is proximately located to the antenna. When the proximity sensor 310 no longer indicates the passenger's proximity, the WAP controller 300 may reverse the handover process to return one or both sessions back to being carried by the first WiFi AD WAP 340a.

Figure 5:
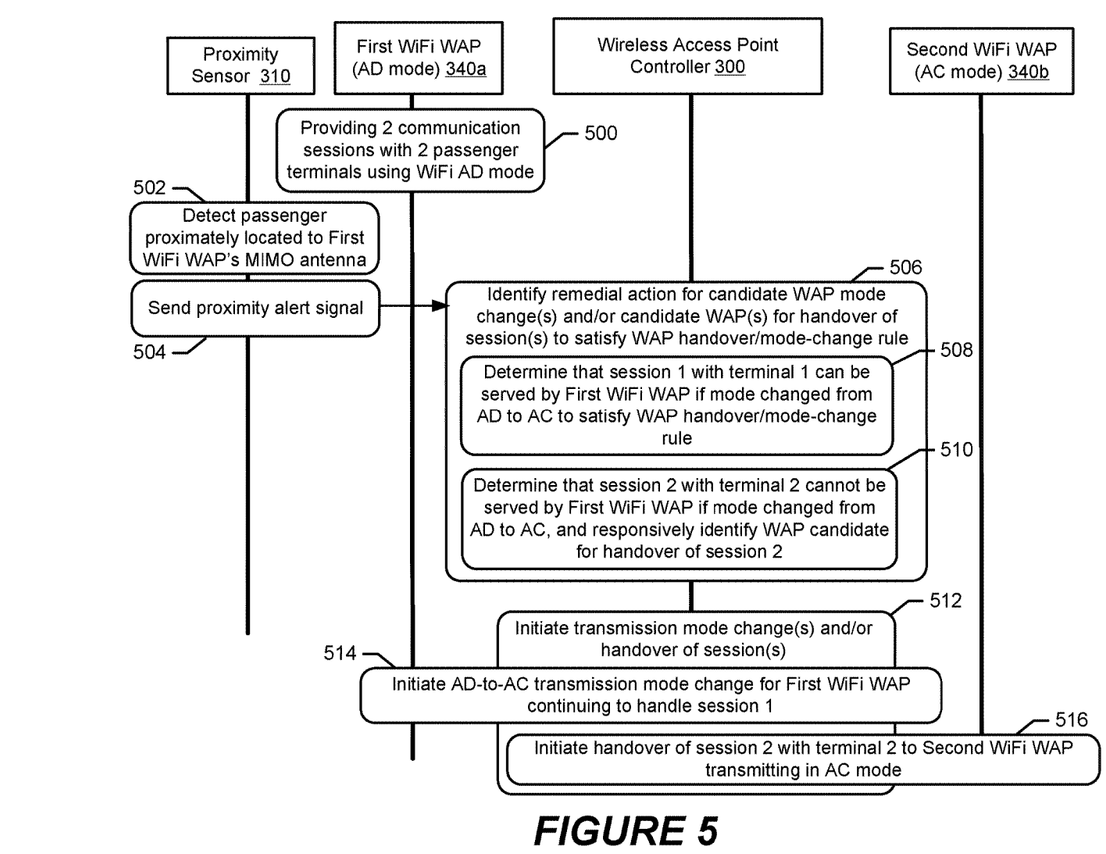
FIG. 5 is a combined flowchart and data flow diagram of operations and methods performed by the WAP controller, the WAPs, and the proximity sensors of FIG. 3 to perform handover between WAPs and further perform WAP transmission mode changes based on passenger proximity in accordance with some embodiments of the present disclosure.

FIG. 5 is a combined flowchart and data flow diagram of operations and methods performed by the WAP controller 300, the WAPs 340a,340b, and the proximity sensors 310 of FIG. 3 to perform handover between WAPs and further perform WAP transmission mode changes based on passenger proximity in accordance with some embodiments of the present disclosure.

Referring to FIG. 5, a first WiFi AD WAP 340a is providing (block 500) two communication sessions (session 1 and session 2) to two different passenger terminals 100 (terminal 1 and terminal 2) using WiFi AD mode for transmission and reception. The proximity sensor 310 detects (block 502) that a passenger has become proximately located to the MIMO antenna 344 used by the first WiFi AD WAP 340a, and responsively sends (block 504) a proximity alert signal to the WAP controller 300. The WAP controller 300 responds by identifying (block 506) a remedial action to be taken by one or more candidate WAPs of the system to satisfy a WAP handover/mode-change rule, which in the case of FIG. 5 involves initiating handover of one sessions from WAP 340a to WAP 340b which uses WiFi AD mode for transmission and reception, and initiating transmission mode change in WAP 340a from AD transmission mode to AC transmission mode.

In the example of FIG. 5, the WAP controller 300 determines (block 508) that session 1 with terminal 1 can be served by the first WiFi WAP 340a if the mode is changed from AD to AC to satisfy the WAP handover/mode-change rule, such as because WAP 340a is determined to support AC mode and can provide sufficient bandwidth to carry traffic of session 1 and other identified sessions if downgraded from AD mode to AC mode. The WAP controller 300 also determines (block 510) that session 2 with terminal 2 cannot be served by the first WiFi WAP 340a when changed to AC mode, e.g., due to WAP 340a then having insufficient bandwidth to support session 2 and perhaps other identified sessions, and responsively further identifies WAP candidates (i.e., second WiFi WAP 340b using AD mode) for handover of session 2.

The WAP controller 300 initiates (block 512) a transmission mode change for WAP 340a and inter-WAP handover of session 2. In the further example of FIG. 5, the WAP controller 300 initiates (block 514) transmission mode change for the first WiFi WAP 340a from AD to AC which then continues to carry traffic of session 1. The WAP controller 300 also initiates (block 516) handover of session 2 from the first WiFi WAP 340a to the second WiFi WAP 340b, which transmits in AD mode. The second WiFi WAP 340b may be spaced apart from the first WiFi WAP 340a and use a separate antenna therefrom so that the passenger is not proximately located to its antenna.

In this manner, the WAP controller 300 remedies the situation where the passenger's head is resting against the antenna 344 used by the first WiFi AD WAP 340a by initiating a transmission mode change for the antenna 344 to a safer lower-power and lower-transmission frequency for some ongoing sessions and initiating handover of other sessions to a separate and more distantly located other WiFi WAP 340b. When the proximity sensor 310 no longer indicates the passenger's proximity, the WAP controller 300 may control the first WiFi WAP 340a to revert from AC mode back to operating using AD mode, and may initiate handover of session 2 from the second WiFi WAP 340b back to the first WiFi WAP 340a.

According to more general operations, the WAP controller 300 can operate to determine whether a communication session can continue to be served by a first WAP that is switched to operate in a lower bandwidth transmission mode responsive to evaluation of a rule. Based on determining that the communication session can be served by the first WAP operating in the lower bandwidth transmission mode, the WAP controller 300 can identify as the remedial action to control the first WAP to change transmission mode to operate in the lower bandwidth transmission mode. In contrast, based on determining that the communication session cannot be served by the first WAP operating in the lower bandwidth transmission mode, the WAP controller 300 can identify as the remedial action to perform initiation of handover of the communication session from the first WAP to a second WAP.

The WAP handover/mode-change rule evaluated by the WAP 300 may condition the decision to initiate a change of transmission modes versus initiating handover to another WAP, based on how long the person has remained proximately located to the antenna. In one embodiment, the WAP controller 300 determines from the proximity alert signal whether the person has remained proximately located to the antenna for more than a first threshold time and, if so, whether the person has remained proximately located to the antenna for more than a second threshold time that is greater than the first threshold time. Based on determining that the person has remained proximately located to the antenna for more than the first threshold time but less than the second threshold time, the WAP controller 300 identifies as the remedial action to control the first WAP to change transmission mode that will be used by the first WAP for continued transmission of the communication session. In contrast, based on determining that the person has remained proximately located to the antenna for more than the second threshold time, the WAP controller 300 identifies as the remedial action to perform initiation of handover of the communication session from the first WAP to the second WAP.

Figure 6:
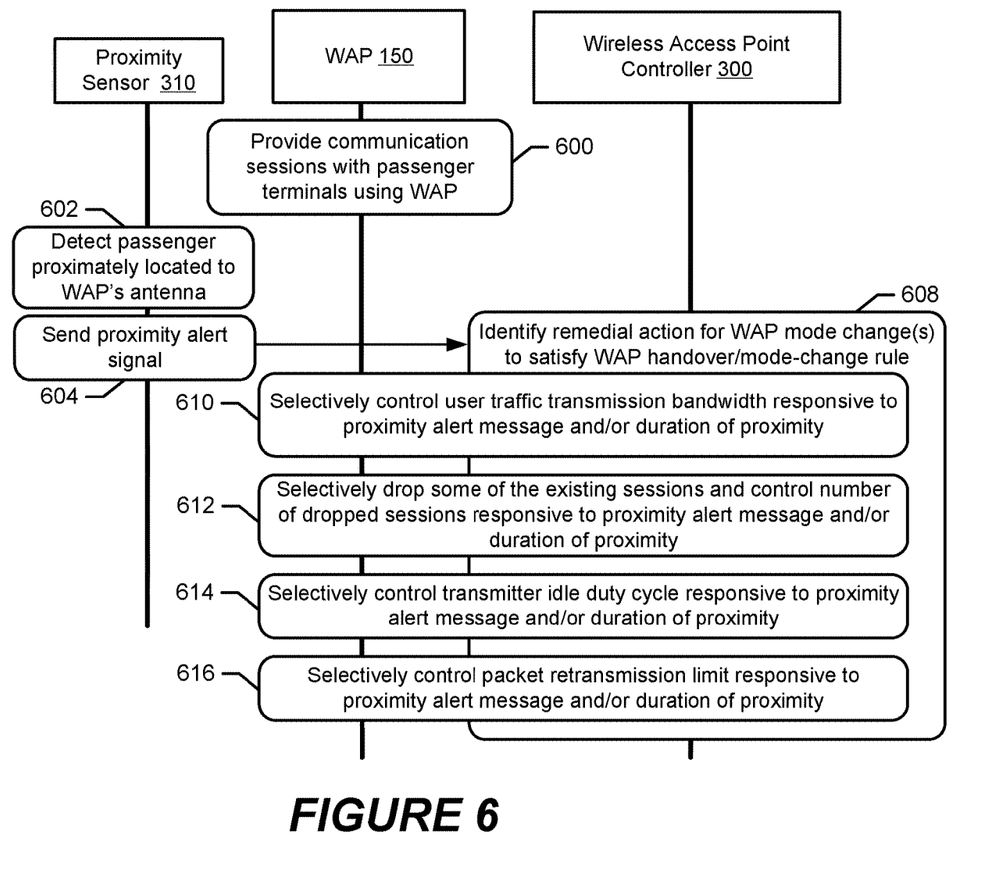
FIG. 6 is a combined flowchart and data flow diagram of operations and methods performed by the WAP controller, the WAPs, and the proximity sensors of FIG. 3 to perform WAP transmission mode changes based on passenger proximity in accordance with some embodiments of the present disclosure.

FIG. 6 is a combined flowchart and data flow diagram of operations and methods performed by the WAP controller 300, a WAP 150, and the proximity sensor 310 of FIGS. 2 and 3 to perform WAP transmission mode changes based on passenger proximity in accordance with some embodiments of the present disclosure.

Referring to FIG. 6, the WAP 340a is providing (block 600) a communication session to a passenger terminal 100. The proximity sensor 310 detects (block 602) that a passenger has become proximately located to the WAP's antenna, and responsively sends (block 604) a proximity alert signal to the WAP controller 300. The WAP controller 300 responds by identifying (block 608) a remedial action to be taken by the WAP 150 to satisfy a WAP handover/mode-change rule, which in the case of FIG. 6 involves selectively controlling various available transmission modes of the WAP 150.

In the example of FIG. 6, the WAP controller 300 selectively controls the transmission bandwidth of the WAP 150 used to transmit user traffic, responsive to the proximity alert message and/or duration of the passenger's proximity to the intent of the WAP 150. In one embodiment, the WAP controller 300 determines based on the proximity alert signal a time duration that the person has remained proximately located to the antenna used by the WAP 150 for transmission of the communication session to the communication terminal. Responsive to determining that the time duration exceeds a first threshold value, the WAP controller 300 controls the WAP 150 to decrease transmission bandwidth, such as by decreasing a duty cycle ratio of active transmission duration to inactive transmitter duration for signal transmission by the first WAP through the antenna. In contrast, responsive to determining that the time duration has dropped below the first threshold value after previously exceeded the first threshold value, the WAP controller 300 controls the WAP 150 to increase the transmission bandwidth, such as by increasing the duty cycle ratio of active transmission duration to inactive transmitter duration for signal transmission by the WAP 150 through the antenna. The WAP controller 300 may control the transmission bandwidth of WAP 150 without affecting the reception bandwidth of WAP 150.

In one embodiment, the WAP controller 300 operates to determine based on the proximity alert signal a time duration that the person has remained proximately located to the antenna used by the WAP 150 for transmission of the communication session to the communication terminal. Responsive to determining that the time duration exceeds a first threshold value, the WAP controller 300 controls the WAP 150 to decrease a packet retransmission limit used to control rate of traffic packet losses the WAP 150 allows in transmissions for the communication session through the antenna. These operations can constrain the WAP 150 to a fewer number of packet retransmissions or to no packet retransmission being allowed when the terminal does not receive packets, which effectively decreases the transmission bandwidth but at a cost of allowing greater loss of packets being transmitted toward the terminal. In contrast, responsive to determining that the time duration has dropped below the first threshold value after previously exceeded the first threshold value, the WAP controller 300 controls the WAP 150 to increase the packet retransmission limit used to control rate of traffic packet losses the first WAP allows in transmissions for the communication session through the antenna.

Example WAP Controller and WAP

FIG. 7 is a block diagram of a WAP controller 300 configured to operate according to some embodiments of the present disclosure. The WAP controller 300 includes a processor 700, a memory 710, and a network interface 720 which may include a radio access network transceiver and/or a wired network interface (e.g., Ethernet interface). The network interface 720 is configured to communicate with and control the WAPs 150 and the ground data link transceiver 170.

The processor 700 may include one or more data processing circuits, such as a general purpose and/or special purpose processor (e.g., microprocessor and/or digital signal processor) that may be collocated or distributed across one or more networks. The processor 700 is configured to execute computer program code in the memory 710, described below as a non-transitory computer readable medium, to perform at least some of the operations described herein as being performed by an access control computer. The computer program code when executed by the processor 700 causes the processor 700 to perform operations in accordance with one or more embodiments disclosed herein for the WAP controller 300 disclosed herein. The WAP controller 300 may further include a user input interface 740 (e.g., touch screen, keyboard, keypad, etc.) and a display device 730.

Figure 8:
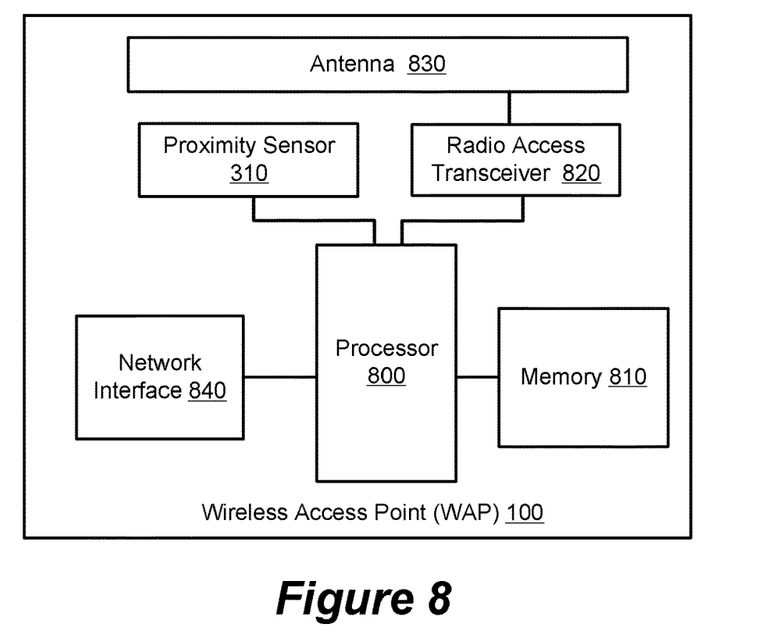
FIG. 8 is a block diagram of a WAP configured to operate in accordance with some embodiments of the present disclosure.

FIG. 8 is a block diagram of a WAP 100 configured to operate according to some embodiments of the present disclosure. The WAP 100 includes a processor 800, a memory 810, a radio access transceiver 820, an antenna 830. The WAP 100 may further include the proximity sensor 310 or be connected to receive the proximity alert signal from the proximity sensor 310. The radio access transceiver 820 can include, but is not limited to, a LTE or other cellular transceiver, WLAN transceiver (IEEE 802.11 A-D, IEEE 802.11 A-C, or other IEEE 802.11), WiMax transceiver, Bluetooth transceiver, or other RF communication transceiver configured to communicate through the antenna 830 with the UEs 100, the PDUs the SVDUs 110, the PDUs 112, the content server 160, the WAP controller 300, and/or the ground data link transceiver 170. The WAP 100 may also include a wired network interface 840 (e.g., Ethernet) that is configured to communicate with the SVDUs 110, the PDUs 112, the content server 160, the WAP controller 300, and/or the ground data link transceiver 170.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an access control computer. The computer program code when executed by the processor 800 causes the processor 800 to perform operations in accordance with one or more embodiments disclosed herein for a WAP 100.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An in-flight entertainment system comprising:
a plurality of wireless access points (WAPs) spaced apart within an aircraft and mounted to structures of the aircraft, each of the WAPs connected to an antenna used by the WAP for transmission of communication sessions to communication terminals;
a plurality of proximity sensors, each mounted adjacent to a different one of the antennas and configured to generate a proximity alert signal indicating that a passenger is proximately located to the antenna; and
a WAP controller configured to control radio transmission from the WAPs of traffic in communication sessions, the WAP controller comprising:
a network interface that communicates with the WAPs through a network;
a processor coupled to the network interface; and
a memory coupled to the processor and storing program code that when executed by the processor causes the processor to perform operations comprising:
receiving a proximity alert signal from one of the proximity sensors indicating that a passenger is proximately located to a first one of the antennas used by a first one of the WAPs for transmission of a communication session;

identifying a remedial action responsive to evaluating a WAP handover/mode-change rule based on the proximity alert signal and characteristics of the communication session; and
performing the remedial action as one of: 1) initiating handover of the communication session from the first one of the WAPs to a second one of the WAPs to satisfy the WAP handover/mode-change rule; and 2) initiating a change in transmission mode that will be used by the first one of the WAPs for continued transmission of the communication session to satisfy the WAP handover/mode-change rule.

2. The in-flight entertainment system of claim 1, wherein the identifying the remedial action responsive to evaluating the WAP handover/mode-change rule based on the proximity alert signal and characteristics of the communication session, comprises:
determining whether the communication session can be served by the first one of the WAPs operating in a lower bandwidth transmission mode responsive to the evaluation of the WAP handover/mode-change rule; and
based on determining that the communication session can be served by the first one of the WAPs operating in the lower bandwidth transmission mode, identifying as the remedial action to control the first one of the WAPs to change transmission mode to operate in the lower bandwidth transmission mode; and
based on determining that the communication session cannot be served by the first one of the WAPs operating in the lower bandwidth transmission mode, identifying as the remedial action to perform initiation of handover of the communication session from the first one of the WAPs to the second one of the WAPs.

3. A method by a processor of a wireless access point (WAP) controller to control radio transmission of traffic in communication sessions from WAPs to communication terminals, the method comprising:
receiving a proximity alert signal from a proximity sensor indicating that a person is proximately located to an antenna used by a first WAP for transmission of a communication session to a communication terminal;
identifying a remedial action responsive to evaluating a WAP handover/mode-change rule based on the proximity alert signal and characteristics of the communication session, wherein the identification of the remedial action comprises:
determining from the proximity alert signal whether the person has remained proximately located to the antenna for more than a first threshold time and, if so, whether the person has remained proximately located to the antenna for more than a second threshold time that is greater than the first threshold time;
based on determining that the person has remained proximately located to the antenna for more than the first threshold time but less than the second threshold time, identifying as the remedial action to control the first WAP to change transmission mode that will be used by the first WAP for continued transmission of the communication session; and
based on determining that the person has remained proximately located to the antenna for more than the second threshold time, identifying as the remedial action to perform initiation of handover of the communication session from the first WAP to a second WAP; and
performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule.

4. The method of claim 3, wherein the identifying as the remedial action to perform initiation of handover of the communication session from the first WAP to the second WAP comprises:
determining that the communication session with the communication terminal can be served by the second WAP responsive to the evaluation of the WAP handover/mode-change rule; and
responsive to the determination, identifying as the remedial action to perform initiation of handover of the communication session from the first WAP to the second WAP.

5. The method of claim 4, wherein the determining that the communication session with the communication terminal can be served by the second WAP responsive to the evaluation of the WAP handover/mode-change rule, comprises:
determining that a quality of service, which would be provided by the second WAP for the communication session upon handover from the first WAP, satisfies the WAP handover/mode-change rule.

6. A method by a processor of a wireless access point (WAP) controller to control radio transmission of traffic in communication sessions from WAPs to communication terminals, the method comprising:
receiving a proximity alert signal from a proximity sensor indicating that a person is proximately located to an antenna used by a first WAP for transmission of a communication session to a communication terminal;
identifying a remedial action responsive to evaluating a WAP handover/mode-change rule based on the proximity alert signal and characteristics of the communication session, wherein the identification of the remedial action comprises:
determining that the communication session with the communication terminal can be served by the first WAP operating in a lower bandwidth transmission mode responsive to the evaluation of the WAP handover/mode-change rule; and
identifying as the remedial action to control the first WAP to change transmission mode to operate in the lower bandwidth transmission mode; and
performing the remedial action as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule, by controlling the first WAP to initiate change of the transmission mode, that will be used by the first WAP for continued transmission of the communication session, to the lower bandwidth transmission mode to satisfy the WAP handover/mode-change rule.

7. The method of claim 6, wherein:
the identifying as the remedial action that the communication session with the communication terminal can be served by the first WAP operating in the lower bandwidth transmission mode responsive to the evaluation of the WAP handover/mode-change rule, comprises:

identifying as the remedial action, based on evaluation of the WAP handover/mode-change rule, that the communication session with the communication terminal is being served by the first WAP operating in WiFi 802.11 A-D mode and can continue to be served by the first WAP when operating in WiFi 802.11 A-C mode; and the performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule, comprises:

changing the transmission mode, based on evaluation of the WAP handover/mode-change rule, to the downgraded transmission mode for use by the first WAP for continued transmission of the communication session.

8. A method by a processor of a wireless access point (WAP) controller to control radio transmission of traffic in communication sessions from WAPs to communication terminals, the method comprising:

receiving a proximity alert signal from a proximity sensor indicating that a person is proximately located to an antenna used by a first WAP for transmission of a communication session to a communication terminal;

identifying a remedial action responsive to evaluating a WAP handover/mode-change rule based on the proximity alert signal and characteristics of the communication session, wherein the identification of the remedial action comprises:

determining whether the communication session with the communication terminal can be served by the first WAP operating in a lower bandwidth transmission mode responsive to the evaluation of the WAP handover/mode-change rule; and based on determining that the communication session can be served by the first WAP operating in the lower bandwidth transmission mode, identifying as the remedial action to control the first WAP to change transmission mode to operate in the lower bandwidth transmission mode; and based on determining that the communication session cannot be served by the first WAP operating in the lower bandwidth transmission mode, identifying as the remedial action to perform initiation of handover of the communication session from the first WAP to a second WAP; and performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule.

9. A method by a processor of a wireless access point (WAP) controller to control radio transmission of traffic in communication sessions from WAPs to communication terminals, the method comprising:

receiving a proximity alert signal from a proximity sensor indicating that a person is proximately located to an antenna used by a first WAP for transmission of a communication session to a communication terminal;

identifying a remedial action responsive to evaluating a WAP handover/mode-change rule based on the proximity alert signal and characteristics of the communication session; and performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule, wherein the initiating a change in transmission mode comprises:

determining based on the proximity alert signal a time duration that the person has remained proximately located to the antenna used by the first WAP for transmission of the communication session to the communication terminal; and controlling the first WAP to decrease a duty cycle ratio of active transmission duration to inactive transmitter duration for signal transmission by the first WAP through the antenna, responsive to determining that the time duration exceeds a first threshold value; and controlling the first WAP to increase the duty cycle ratio of active transmission duration to inactive transmitter duration for signal transmission by the first WAP through the antenna, responsive to determining that the time duration has dropped below the first threshold value after previously exceeded the first threshold value.

10. A method by a processor of a wireless access point (WAP) controller to control radio transmission of traffic in communication sessions from WAPs to communication terminals, the method comprising:

receiving a proximity alert signal from a proximity sensor indicating that a person is proximately located to an antenna used by a first WAP for transmission of a communication session to a communication terminal;

identifying a remedial action responsive to evaluating a WAP handover/mode-change rule based on the proximity alert signal and characteristics of the communication session; and performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule, wherein the initiating a change in transmission mode comprises:

determining based on the proximity alert signal a time duration that the person has remained proximately located to the antenna used by the first WAP for transmission of the communication session to the communication terminal; and controlling the first WAP to decrease a packet retransmission limit used to control rate of traffic packet losses the first WAP allows in transmissions for the communication session through the antenna, responsive to determining that the time duration exceeds a first threshold value; and controlling the first WAP to increase the packet retransmission limit used to control rate of traffic packet losses the first WAP allows in transmissions for the communication session through the antenna, responsive to determining that the time duration has dropped below the first threshold value after previously exceeded the first threshold value.

11. The method of claim 8, wherein the receiving a proximity alert signal from the proximity sensor indicating that the person is proximately located to the antenna used by the first WAP for transmission of the communication session to the communication terminal, comprises:

processing a video signal from a camera within a seat video display unit to determine that the person's body is resting against a portion of the seat video display unit having the antenna.

12. The method of claim 8, wherein the receiving the proximity alert signal from the proximity sensor indicating that the person is proximately located to the antenna used by the first WAP for transmission of the communication session to the communication terminal, comprises:

determining from an electrical capacitance sensor within a housing that also encloses a multiple-input and multiple-output antenna, that the person's body is within a threshold distance of the housing.

13. A wireless access point (WAP) controller to control radio transmission from WAPs of traffic in communication sessions to communication terminals, the WAP controller comprising:

a network interface;
a processor coupled to the network interface; and
a memory coupled to the processor and storing program code that when executed by the processor causes the processor to perform operations comprising:
  receiving a proximity alert signal from a proximity sensor indicating that a person is proximately located to an antenna used by a first WAP for transmission of a communication session to a communication terminal;
  identifying a remedial action responsive to evaluating a WAP handover/mode-change rule based on the proximity alert signal and characteristics of the communication session, wherein the identification of the remedial action comprises:
    determining from the proximity alert signal whether the person has remained proximately located to the antenna for more than a first threshold time and, if so, whether the person has remained proximately located to the antenna for more than a second threshold time that is greater than the first threshold time;
    based on determining that the person has remained proximately located to the antenna for more than the first threshold time but less than the second threshold time, identifying as the remedial action to control the first WAP to change transmission mode that will be used by the first WAP for continued transmission of the communication session; and
    based on determining that the person has remained proximately located to the antenna for more than the second threshold time, identifying as the remedial action to perform initiation of handover of the communication session from the first WAP to a second WAP; and
  performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule.

14. The wireless access point (WAP) controller of claim 13, wherein:

the identifying the remedial action responsive to evaluating the WAP handover/mode-change rule based on the proximity alert signal and characteristics of the communication session, comprises:
  determining that the communication session with the communication terminal can be served by the second WAP responsive to the evaluation of the WAP handover/mode-change rule; and
  responsive to the determination, identifying as the remedial action to perform initiation of handover of the communication session from the first WAP to the second WAP; and
the performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule, comprises:
  initiating handover of the communication session from the first WAP to the second WAP.

15. A wireless access point (WAP) controller to control radio transmission from WAPs of traffic in communication sessions to communication terminals, the WAP controller comprising:

a network interface;
a processor coupled to the network interface; and
a memory coupled to the processor and storing program code that when executed by the processor causes the processor to perform operations comprising:
  receiving a proximity alert signal from a proximity sensor indicating that a person is proximately located to an antenna used by a first WAP for transmission of a communication session to a communication terminal;
  identifying a remedial action responsive to evaluating a WAP handover/mode-change rule based on the proximity alert signal and characteristics of the communication session, wherein the identification of the remedial action comprises:
    determining that the communication session with the communication terminal can be served by the first WAP operating in a lower bandwidth transmission mode responsive to the evaluation of the WAP handover/mode-change rule; and
    identifying as the remedial action to control the first WAP to change transmission mode to operate in the lower bandwidth transmission mode; and
  performing the remedial action as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule, by:
    controlling the first WAP to initiate change of the transmission mode, that will be used by the first WAP for continued transmission of the communication session, to the lower bandwidth transmission mode to satisfy the WAP handover/mode-change rule.

16. A wireless access point (WAP) controller to control radio transmission from WAPs of traffic in communication sessions to communication terminals, the WAP controller comprising:

a network interface;
a processor coupled to the network interface; and
a memory coupled to the processor and storing program code that when executed by the processor causes the processor to perform operations comprising:
   receiving a proximity alert signal from a proximity sensor indicating that a person is proximately located to an antenna used by a first WAP for transmission of a communication session to a communication terminal;
   identifying a remedial action responsive to evaluating a WAP handover/mode-change rule based on the proximity alert signal and characteristics of the communication session, wherein the identification of the remedial action comprises
      determining whether the communication session with the communication terminal can be served by the first WAP operating in a lower bandwidth transmission mode responsive to the evaluation of the WAP handover/mode-change rule; and
      based on determining that the communication session can be served by the first WAP operating in the lower bandwidth transmission mode, identifying as the remedial action to control the first WAP to change transmission mode to operate in the lower bandwidth transmission mode; and
      based on determining that the communication session cannot be served by the first WAP operating in the lower bandwidth transmission mode, identifying as the remedial action to perform initiation of handover of the communication session from the first WAP to a second WAP; and
   performing the remedial action as one of: 1) initiating handover of the communication session from the first WAP to the second WAP to satisfy the WAP handover/mode-change rule; and 2) initiating a change in transmission mode that will be used by the first WAP for continued transmission of the communication session to satisfy the WAP handover/mode-change rule.

17. A wireless access point (WAP) controller to control radio transmission from WAPs of traffic in communication sessions to communication terminals, the WAP controller comprising:
a network interface;
a processor coupled to the network interface; and
a memory coupled to the processor and storing program code that when executed by the processor causes the processor to perform operations comprising:
   receiving a proximity alert signal from a proximity sensor indicating that a person is proximately located to an antenna used by a first WAP for transmission of a communication session to a communication terminal;
   identifying a remedial action responsive to evaluating a WAP handover/mode-change rule based on the proximity alert signal and characteristics of the communication session; and
   performing the remedial action as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule, wherein the initiating the change in the transmission comprises:
      determining based on the proximity alert signal a time duration that the person has remained proximately located to the antenna used by the first WAP for transmission of the communication session to the communication terminal; and
      controlling the first WAP to decrease a duty cycle ratio of active transmission duration to inactive transmitter duration for signal transmission by the first WAP through the antenna, responsive to determining that the time duration exceeds a first threshold value; and
      controlling the first WAP to increase the duty cycle ratio of active transmission duration to inactive transmitter duration for signal transmission by the first WAP through the antenna, responsive to determining that the time duration has dropped below the first threshold value after previously exceeded the first threshold value.

18. A wireless access point (WAP) controller to control radio transmission from WAPs of traffic in communication sessions to communication terminals, the WAP controller comprising:
a network interface;
a processor coupled to the network interface; and
a memory coupled to the processor and storing program code that when executed by the processor causes the processor to perform operations comprising:
   receiving a proximity alert signal from a proximity sensor indicating that a person is proximately located to an antenna used by a first WAP for transmission of a communication session to a communication terminal;
   identifying a remedial action responsive to evaluating a WAP handover/mode-change rule based on the proximity alert signal and characteristics of the communication session; and
   performing the remedial action as one of: 1) initiating handover of the communication session from the first WAP to a second WAP to satisfy the WAP handover/mode-change rule; and 2) initiating a change in transmission mode that will be used by the first WAP for continued transmission of the communication session to satisfy the WAP handover/mode-change rule, wherein the initiating the change in the transmission comprises:
      determining based on the proximity alert signal a time duration that the person has remained proximately located to the antenna used by the first WAP for transmission of the communication session to the communication terminal; and
      controlling the first WAP to decrease a packet retransmission limit used to control rate of traffic packet losses the first WAP allows in transmissions for the communication session through the antenna, responsive to determining that the time duration exceeds a first threshold value; and
      controlling the first WAP to increase the packet retransmission limit used to control rate of traffic packet losses the first WAP allows in transmissions for the communication session through the antenna, responsive to determining that the time duration has dropped below the first threshold value after previously exceeded the first threshold value.

* * * * *